United States Patent

[11] 3,615,785

[72] Inventors Howard H. Moorer
Charleston;
Charles M. Anderegg, Sullivan's Island, both of S.C.
[21] Appl. No. 702,519
[22] Filed Feb. 2, 1968
[45] Patented Oct. 26, 1971
[73] Assignee West Virginia Pulp and Paper Company
New York, N.Y.

[54] CEMENT GRINDING AID AND PACK SET INHIBITOR
12 Claims, No Drawings
[52] U.S. Cl.................................................. 106/90, 106/314, 106/315
[51] Int. Cl................................................. C04b 13/26
[50] Field of Search.................................. 106/314, 90, 92, 95, 315; 252/71, 73, 74, 79, 42

[56] References Cited
UNITED STATES PATENTS

| | | | |
|---|---|---|---|
| 3,385,792 | 5/1968 | Morway | 252/42 |
| 3,211,675 | 10/1965 | Johnson | 106/87 |
| 2,487,080 | 11/1949 | Swenson | 252/42 |

*Primary Examiner*—Tobias E. Levow
*Assistant Examiner*—W. T. Scott
*Attorneys*—Robert S. Grimshaw and Ernest B. Lipscomb, III ABSTRACT: Additive compositions for use as grinding aids and pack set inhibitors in the manufacture of hydraulic cement composed of a water-soluble polyol, particularly a glycol, and a water-soluble salt of an aliphatic acid having no more than three carbons, said additive compositions being used either alone or in combination with water-soluble salts of a sulfonated lignin, a water-soluble hydroxyalkyl amine and urea, the hydraulic cement product of this addition and the method for making the cement product.

CEMENT GRINDING AID AND PACK SET INHIBITOR

This invention relates to additive compositions for incorporation in hydraulic cements, for example, Portland cements, the resultant hydraulic cement mixes containing the additive compositions, and to the process for making these cements.

This invention relates more particularly to additive compositions for use as grinding aids and pack set inhibitors in the manufacture of hydraulic cements and to hydraulic cements containing these compositions.

Hydraulic cements are produced by calcining suitable raw materials, generally a mixture of calcareous and argillaceous materials, to produce a sintered "clinker." Of the hydraulic cements, Portland types are by far the most important cements in terms of quantity produced. The clinker is mixed with small amounts of gypsum and ground, usually in some type of ball mill, to a finely divided state having a relatively large surface area to yield the finished cement. Grinding of the clinker consumes substantial quantities of time and energy. It is common practice in the cement industry to employ grinding aids which increase the efficiency of the grinding operation thereby lowering the power required to grind a unit of cement and which decrease the plant investment either by increasing the through put of a given grinding mill or by reducing the size of mill needed to grind a given amount of cement. The addition of a grinding aid enables the mill to grind the clinker to a smaller size with less energy by prohibiting the buildup of a coating of finer material on the grinding media and walls of the mill by coating the nascent surfaces of the cement clinker. This coating of the cement clinker reduces the higher energy forces present on the nascent surface. Caution must be taken to prevent undue reduction of the surface forces because the cement becomes excessively fluid.

After grinding, most cements become semirigid when compacted by vibrations and will not flow until considerable mechanical effort has been applied to disintegrate the semirigid mass. The reduction in amount of energy necessary to initiate flow in cement is referred to as "pack set inhibition." The pack set inhibition property is particularly important in unloading the dry cement powder from storage silos and/or after transportation of the cement in trucks, barges, and railroad hopper cars. The tendency to pack set is effectively inhibited by a reduction in the high surface energy of the cement produced upon grinding.

It is, therefore, a primary object of this invention to provide additive compositions for hydraulic cements which function as both grinding aids and pack set inhibitors.

Accordingly, it is an object of this invention to provide a hydraulic cement, particularly a Portland cement, or other cementitious composition containing an additive which functions as both a grinding aid and a pack set inhibitor.

It is another object of this invention to provide a process for increasing the grinding efficiency of and inhibiting the pack set of hydraulic cement by the addition thereto of a small but effective amount of an additive without deleteriously affecting the desirable properties of the cement.

It has been found that by intergrinding with hydraulic cement small quantities of an additive composed of a water-soluble polyol and a water-soluble salt of an aliphatic acid having no more than three carbons unexpectedly produces a synergistic effect which increases the grinding efficiency of the clinker and retards pack set of the cement to such a degree that neither can do alone. Only a small amount of additive need be used to achieve the desired results. When added to a Portland clinker at addition rates below 0.005 percent based on the weight of the cement, the grinding efficiency and the pack set inhibition are not improved and at addition rates above about 1.0 percent based on the weight of the cement, the improvement rates are not significant. The preferred range is, based upon an economically acceptable amount, generally 0.01 to 0.05 percent. One ounce of additive per barrel of cement amounts to approximately 0.0166 percent by weight of cement. The additive is most conveniently and usually prepared as a solution in water and when interground with the clinker is mechanically dispersed over the nascent surfaces thus reducing the surface forces of the cement to such a desired state that the results show substantially improved grinding and reduced mill retention times as well as facilitating subsequent storage and/or transportation. The reason for employing the additive as an aqueous solution is that only about 1-ounce solids weight basis is used per barrel. The aqueous solution enables the additive to be diluted and therefore circulated quickly and evenly throughout the grinding mill.

Various other additive agents for hydraulic cement mixes have been used both alone and in conjunction with grinding aids and as pack set inhibitors, to achieve results of a similar character or to modify other properties of the hydraulic cements, as required by their particular use. However, the effects of combining known additive agents with the additive compositions noted above, have been surprisingly and unpredictably greater than the sum of their individual effects. The addition to the above additive compositions of an amine accelerator, salts of sulfonated lignin and/or urea when added either individually or in combination produce desirable additional improvements. The combination of one or several of these additive agents produces a large variety of tailoring grinding aids, the formulation to finally be determined by performance desired and economics.

The polyols referred to for the purpose of this invention include those aliphatic alcohols containing two or more hydroxy groups that are water-soluble. By water-soluble, it is meant that at least 5 grams of the polyol will dissolve in 100 grams of water. It is important that the polyol be completely water-soluble because the additive is most conveniently used in an aqueous solution. The polyols of this invention include the water-soluble diols such as ethylene glycol, propylene glycols, polyethylene glycols, polypropylene glycols, diethylene glycol, triethylene glycol, dipropylene glycol and tripropylene glycol, combinations of these glycols, their derivatives, and reaction products formed by reacting ethylene and propylene oxide or polyethylene glycols and polypropylene glycols with active hydrogen base compounds (polyalcohols, polycarboxylic acids, polyamines, or polyphenols). Other glycols contemplated include neopentyl glycol, pentanediols, butanediols, and such unsaturated diols as butyne diols and butene diols. In addition to the diols, the triol, glycerol, and such derivatives as ethylene or propylene oxide adducts make excellent grinding aids. Other higher polyols may include pentaerythritol. Another class of polyhydroxy alcohols contemplated are the sugar alcohols. The sugar alcohols are obtained by reduction of carbohydrates and differ greatly from the above-mentioned polyols. These polyols are considered useful as grinding aids. Of the sugar alcohols mannitol and sorbitol are preferred. Numerous other polyols which meet the requirements of being an effective grinding aid and pack set inhibitor when combined with the salt of an aliphatic acid having no more than three carbons will occur to those skilled in the art and the hereinabove list is intended to be illustrative only.

The preferred polyols include the water-soluble dihydric alcohols (glycols). The preferred glycols are the mono- and polyglycols of ethylene and propylene. These glycols are preferred primarily because of their cost and their water solubility. The polyglycols of ethylene are water-soluble at molecular weights at least as high as 20,000. The polyglycols of propylene, although giving slightly better grinding efficiency than the ethylene glycols, are completely water-soluble up to molecular weights of only about 1,000.

As the number of carbons in the alcohol chain increases the water solubility tends to decrease thus limiting the available glycols. For example, polybutylene glycol having a molecular weight of about 500 is only slightly soluble in water while polyethylene glycol of the same molecular weight is infinitely soluble. In the practice of this invention mixtures of the polyols may be effectively used. Although commercial grade polyols are generally preferred, crude grades are sometimes used because of their economic benefits. By crude grades, it is meant, the less refined mixtures of polyols obtained from commercial processes either from original production of the polyols or reclaimed from other manufacturing processes. The polyols when used alone do increase grinding efficiency somewhat, but in the process the tendency to pack set is greatly increased. The use of dihydroxy polyols (glycols) as grinding aids is well known in the art and their use is set forth in U.S. Pat. No. 2,225,146. However, it has been found the combinations of polyols with the water-soluble salts of aliphatic acids having no more than three carbons produces a grinding aid that is more efficient than a polyol alone and effectively inhibits pack set at the same time.

The additives, therefore, contemplate in combination with a polyol the water-soluble salts aliphatic acids of no more than three carbons, i.e., acetic, formic, and propionic. Among examples of water-soluble salts which may be employed are salts of the alkali metals, alkaline earth metals, ammonia, aluminum, cobalt, and iron. Numerous other salts of aliphatic acids of no more than three carbons which are water-soluble will occur to those skilled in the art. The most commonly used and preferable salts are the sodium and potassium salts of acetic acid. High acetic acid concentrations with sodium tend to crystallize above 80 percent solids. For this reason potassium acetate is used when high solids concentrations are desired. The use of acetates as pack set inhibitors is well known (see U.S. Pat. No. 2,857,286); however, when added to the grinding mill an acetate, when used alone, has an adverse effect on grinding. This effect is pointed out by U.S. Pat. No. 3,094,425 which teaches the use of pack set inhibiting amount of acetic acid in a grinding mill will impair rather than help grinding. As the following examples will show, when combined with a water-soluble polyol, aliphatic acids and their water-soluble salts are more effective as grinding aids than either the polyol or the salt of the aliphatic acid having no more than three carbons when used alone.

In addition to an additive of a water-soluble polyol and the salt of an aliphatic acid having no more than three carbons it is preferable to include other additive agents which further increase the grinding efficiency and further inhibit pack set by adding to the synergistic effect produced. One preferred additive agent is an accelerator such as that disclosed in U.S. Pat. No. 2,031,621. This accelerator is a water-soluble hydroxyalkyl amine or a salt derivative thereof. The most effective of this class being triethanolamine. It is preferable to use a commercial grade which consists mostly of triethanolamine together with smaller amounts of the primary and secondary amine. Other well-known hydroxy-alkyl amine accelerators may also be successfully employed.

Another important class of additives are the water-soluble salts of sulfonated lignin and sulfonated lignin derivatives. These lignins are principally obtained as byproducts from sulfite pulping of woody materials. The waste liquors from such pulping contain large quantities of lignin and lignin products in conjunction with other materials. The sulfonated lignin additionally may be produced by reacting lignins obtained from alkali pulping, acid hydrolysis or other known recovery process with an inorganic sulfite, e.g., sodium sulfite, whereby sulfonate groups are added to the lignin. For use in this invention, any of the various water-soluble sulfonated lignins may be employed. It is preferable, however, to utilize sulfonated lignins which are free of carbohydrate materials. Sulfonated lignins obtained from reaction of sulfites with lignin do not contain any appreciable amounts of these carbohydrates and consequently may be employed as is. The sulfonated lignins may be converted into water-soluble salts, and used as such, as disclosed in U.S. Pat. No. 2,141,570. The use of sulfonated lignins if added to improve grinding serves to entrain air in the cement and to reduce the water required to give proper flow of the concrete mix. Further the low cost of these lignin salts makes a more economical product.

Another addition to the product may be urea, which aids grinding efficiency. The urea when used in amounts up to about 5 percent of the sulfonated lignin material also increases the compressive strengths of cement. However, urea may be used in larger amounts with other additives without any deleterious effects on strength and set time.

The inclusion of each additive agent either individually or in combination serves to increase the grinding efficiency while inhibiting pack set and retaining other desirable properties of cement when added to the grinding mill.

The term grinding aid describes an increase in production at constant product surface area or an increase in surface area at a constant production rate during the grinding of the clinker and gypsum in the finish mill.

The pack set index is a relative term which numerically indicates the proclivity of a particular cement to pack set when it is stored in or transported in bulk. The pack set index is obtained in the following manner: 100 grams of cement are placed in a 250-millimeter Erlenmeyer flask set on top of a variable vibrator. The flask containing the cement is vibrated for 15 seconds after which time it is removed from the vibrator and carefully placed in a jig with the axis of the flask lying horizontally. The flask is then rotated around its axis until the compacted cement collapses. The flask is twisted by turning at 180° angles at approximately 100 twists per minute. The number of 180° twists required for the cement sample to collapse establishes the pack set index. Thus, the greater the energy required to break up the bed, the higher will be the pack set index. The pack set index obtained by this method correlates well with the field performance of the cement. The higher the pack set index of the particular cement, the more prone a larger volume of that cement is to pack set if maintained in bulk.

The practice of this invention may clearly be seen in the following examples.

EXAMPLE I

As an example of the basic formulations of this invention, potassium hydroxide was dissolved in water and polypropylene glycol and glacial acetic acid were added with stirring. The exothermic reaction was allowed to cool and then the additive was employed in grinding a Portland-type I clinker. One ounce of formulation per barrel was added. Several compositions varying the ratio of glycol to acetate were made and each compared to a blank, i.e., a clinker ground without an additive.

| Grinding Aid | Solids Content, % | Composition | Ratio of Glycol to Acetate by Weight |
|---|---|---|---|
| A | 100.0 | Propylene glycol | |
| B | 99.2 | Propylene glycol-acetate | 90:10 |
| C | 82.0 | Propylene glycol-acetate | 60:40 |
| D | 77.7 | Propylene glycol-acetate | 40:60 |
| E | 71.8 | Propylene glycol-acetate | 10:90 |

The above combinations were compared and the results in the table below illustrate the effects of grinding and pack set on the ground cement. The data in this table show a comparison of the invention compositions to the blank as a plus or minus value of that blank.

| Additive | Blaine fineness after | | | Air Content | Pack set index | Compressive strength | | |
|---|---|---|---|---|---|---|---|---|
| | 40 min. | 60 min. | 80 min. | | | 3 days | 7 days | 28 days |
| A | +533 | +272 | +230 | 9.6 | 20.0 | +75 | +225 | -242 |
| B | +443 | +192 | +202 | 10.0 | 9.0 | +175 | +175 | -200 |
| C | +316 | +92 | +212 | 8.5 | 10.2 | -83 | -152 | -116 |
| D | +381 | +362 | +114 | 9.6 | 10.8 | -87 | -102 | -133 |
| E | +491 | +282 | +237 | 9.6 | 11.2 | +8 | -58 | -9 |

Notes:
Blaine fineness (sq. cm/gm) by ASTM C204-55.
Air content, percent by ASTM C185-59.
Compressive strength in p.s.i. by ASTM C109-64.

The surface area increases obtained with the glycol-acetate combinations of this invention as compared to a blank and polypropylene glycol established that the combinations of the present invention improved grinding efficiencies to a markedly greater degree than the blank and was slightly better than propylene glycol above a Blaine fineness of about 4,100 sq. cm./gm. The critical factor was that pack set inhibition was lost when propylene glycol alone was used. The pack set index of the blank was 12.2 and went sharply upward to 20 when propylene glycol alone was used, but when the additive compositions of this invention (B through E) were used the pack set index was as low as 9.0. Also, any loss in compressive strength was negligible and the air entrainment was within acceptable limits. The propylene glycol used was commercially obtained and was the most comparable of the glycols contemplated.

EXAMPLE II

The data in the following table illustrate the effects that the additive compositions of this invention have on the grinding of cement clinkers and the inhibition of pack set on the ground cement and the effects on mortars made therefrom. The data appearing in this table was obtained by testing individual batches of the same Portland-type I cement, each of which was prepared in the following manner; a 24-inch pilot ball mill containing steel balls graded from one-half inch to 2 inches was heated to about 280° F; the additive was mixed directly with the clinker at the rate of 1 ounce of additive per barrel of cement and thereafter the mix was charged to the mill. After rotating for predetermined amounts of time, portions of the ground cement were removed. The fineness, pack set index and other properties of the ground cement were determined.

| Additive | Blaine fineness after | | | Air Content | Pack set index | Compressive strength | | |
|---|---|---|---|---|---|---|---|---|
| | 40 min. | 60 min. | 80 min. | | | 3 days | 7 days | 28 days |
| Blank | 3357 | 3818 | 4138 | 9.6 | 12.2 | 908 | 1733 | 3108 |
| Propyleneglycol | 3890 | 4090 | 4360 | 9.6 | 20.0 | 1083 | 1858 | 3350 |
| Commercial | 3660 | 4183 | 4280 | 10.0 | 7.2 | 975 | 1617 | 3067 |
| Composition "B" | 3800 | 4010 | 4340 | 10.0 | 9.0 | 1083 | 1903 | 3308 |
| Composition "F" | 4292 | 4320 | 4361 | 10.0 | 5.2 | 867 | 1775 | 3167 |
| Composition "G" | 3960 | 3970 | 4112 | 10.6 | 7.8 | 992 | 1775 | 2950 |

Notes:
Blaine fineness, sq. cm/gm. by ASTM C204-55.
Air content in percent by ASTM C185-59.
Compressive strength in p.s.i. by ASTM C109-64.
Commercial: a commercial additive—REAX 70A by West Virginia Pulp and Paper Company.

Composition "B" of this invention, as identified in the table, was prepared in the following procedure and is the same as Composition "B" in example I: 8.0 parts potassium hydroxide was dissolved in water, 9.2 parts glacial acetic acid and 82.8 parts propylene glycol were added while stirring. To a 60:40 ratio of propylene glycol to acetate (4.7 parts sodium hydroxide and 14.0 parts potassium hydroxide) composition, 11.2 percent by weight of the total additive of a sulfonated lignin and 18.7 percent by weight of the total additive of triethanolamine were added to give Composition "F." Composition "G" was made according to the procedure of example I by mixing 20.4 parts by weight propylene glycol with 33.0 parts by weight sodium acetate and thereafter adding 13.6 parts by weight triethanolamine, 23.0 parts by weight urea and 10.0 parts by weight sulfonated lignin.

The results in the above table show the superiority of additive compositions of the instant invention when compared to a blank, propylene glycol additive, and a leading commercial additive. For comparative purposes, a Blaine fineness of 4,200 (sq. cm./gm.) was reached in under 40 minutes of grinding time when using Composition "F," whereas in order to get the same fineness the grinding time of a blank of the same clinker was over 80 minutes. Grinding time for the clinker with propylene glycol added was over 70 minutes and for the commercial additive was over 60 minutes. Such improvement in grinding efficiency is vitally important to the commercial producer as it means increased saving in power consumption and time. The improvement in pack set index was also quite notable as the pack set index of the blank was 12.2 and the pack set index of Composition "F" was 5.2, which is, of course, a significant inhibition.

Another important factor, air content, stayed about the same varying between 8.5 percent for Composition "C" of example I to 9.6 percent for the blank to 10.6 for Composition "G" of example II. As shown by the table, improvement in compressive strength was somewhat better when using compositions of this invention than when no additive was used.

A propylene glycol-acetate-triethanolamine-sulfonated lignin composition made according to the procedure set forth in example II was produced for experimental use in a commercial plant handling a Portland-type I cement. This formulation was added as a solution of 10 percent solids at a rate of 1.6 ounces per barrel of cement (0.026 percent solids content) and compared to a blank. The production increased from 90 to 105 barrels per hour. The pack set index for the blank was 100+, whereas the additive inhibited pack set to a pack set index of 7. The compressive strengths were significantly the same and the air content of the invention composition increased only slightly. Another important factor is that the grinding mill producing the blank at 90 bbl./hr. had a 600 percent circulating load, whereas the grinding aid reduced the circulating load to 400 percent. This reduction in circulating load is vitally important to the cement producer in terms of power consumed.

Experimental use of the above composition in another commercial plant-handling type I cement resulted in average production increase of from 210 barrels per hour to 215 barrels per hour over the use of the commercial additive of example II.

As noted from the above examples the compositions of this invention provide excellent additives for use in grinding hydraulic cements and in inhibiting pack set. While a wide range of combinations may be employed in the scope of this invention, these combinations, in order to achieve the desired results, must be water-soluble and water-dilutable to low solids content, e.g., about 10 percent solids. The compositions may be used with equal ease from a ratio of 20 parts by weight polyol to one part by weight salt of an aliphatic acid having no more than three carbons to one part by weight polyol to 20 parts by weight of said salt, economics and the particular clinker being the determining factors. The compositions of this invention may be effectively used on any type of cement clinker. These compositions are most conveniently prepared as solutions in water and are generally used at low solids content, with the preferred composition being a glycol-acetate.

The glycol-acetate-triethanolamine-lignin compositions and glycol-acetate-triethanolamine-lignin-urea compositions give better results than glycol-acetate combinations used alone. The amount of triethanolamine or equivalent catalyst or accelerator may be from 0 to 75 percent by weight of the polyol and triethanolamine combined. The preferable amount being 10 to 50 percent by weight. The amount of sulfonated lignin is determined primarily by permissible amount of air entrainment in the resulting cement and by the viscosity of the additive. The above factors limit the amount of sulfonated lignin up to a maximum of 50 percent by weight of the total additive. The preferred range being 10 to 30 percent, because viscosity of the additives within this range are easier to handle. The total amount of urea may be from 0 to 50 percent by weight of the total additive with the preferred range being from 0 to 25 percent by weight of the total additive. When urea is used in amounts over 50 percent, the grinding efficiency of the formulation tends to decrease to a point at which eventually the composition is no longer an effective grinding aid.

While the invention has been described and illustrated herein by references to various specific materials, procedures, and examples, it is understood that the invention is not restricted to the particular materials, combinations of materials, and procedures selected for that purpose. Numerous variations of such details can be employed, as will be appreciated by those skilled in the art.

We claim:
1. A Portland cement additive composition consisting of a water-soluble glycol and a water-soluble alkali metal salt of an aliphatic acid having no more than three carbons, said glycol and said salt being employed in a weight ratio of 1:9 to 9:1 respectively, 0 to 50 percent by weight of the total additive composition being a water-soluble salt of a sulfonated lignin, 0 to 75 percent by weight of a water-soluble hydroxy-alkyl amine based on the combined weight of said glycol and said amine, and 0 to 50 percent by weight based on the total weight of said additive composition of urea.

2. The Portland cement additive composition of claim 1 wherein said water-soluble glycol is selected from the group consisting essentially of monoethylene glycol, polyethylene glycols, monopropylene glycol, polypropylene glycols and mixtures thereof, said water-soluble salt is selected from the group consisting of sodium acetate, potassium acetate and mixtures thereof, and said amine is triethanolamine.

3. The additive of claim 1 wherein said composition is in an aqueous solution.

4. A Portland cement additive composition consisting essentially of:
 a. a water-soluble glycol from the group consisting of monoethylene glycol, polyethylene glycols, monopropylene glycols, polypropylene glycols and mixtures thereof and a water-soluble salt from the group consisting of sodium acetate, potassium acetate and mixtures thereof, the ratio of said glycol and said salt being employed in a weight ratio of 9:1 to 1:9 respectively,
 b. 10 to 30 percent by weight of the total additive composition being a water-soluble salt of a sulfonated lignin,
 c. 10 to 50 percent by weight of triethanolamine based on the combined weight of said glycol and said amine, and
 d. 0 to 25 percent by weight based on the total weight of said additive composition of urea.

5. The cement additive of claim 4 wherein said water-soluble salt is formed by reacting acetic acid and a member of the group consisting of potassium hydroxide, sodium hydroxide and mixtures thereof.

6. A Portland cement additive composition consisting essentially of:
 a. a polypropylene glycol and an acetate from the group consisting essentially of sodium acetate, potassium acetate and mixtures thereof said glycol and acetate being employed in a 1.5:1 weight ratio respectively,
 b. 11.2 percent by weight of the total additive composition being a water-soluble sulfonated lignin, and
 c. 18.7 percent by weight of the total additive composition being triethanolamine.

7. A Portland cement composition containing from about 0.005 to 1.0 percent of an additive consisting essentially of a water-soluble glycol and a water-soluble alkali metal salt of an aliphatic acid having no more than three carbons, the ratio of glycol to salt being employed in a weight ratio of 1:9 to 9:1, 0 to 50 percent by weight of the total additive being a water-soluble salt of a sulfonated lignin, 0 to 75 percent by weight of a water-soluble hydroxy-alkyl amine based on the combined weight of said glycol and said amine, and 0 to 50 percent by weight based on the total weight of said additive of urea.

8. A Portland cement composition containing as an essential ingredient from about 0.1 to 0.5 percent by weight of an additive consisting essentially of:
 a. a water-soluble glycol from the group consisting of monoethylene glycol, polyethylene glycols, monopropylene glycols, polypropylene glycols and mixtures thereof and a water-soluble salt from the group consisting of sodium acetate, potassium acetate and mixtures thereof, the ratio of said glycol and said salt being employed in a weight ratio of between 9:1 to 1:9,
 b. 10 to 30 percent by weight of the total additive being a water-soluble salt of a sulfonated lignin,
 c. 10 to 50 percent by weight of triethanolamine based on the combined weight of said glycol and said amine, and
 d. 0 to 25 percent by weight based on the total weight of said additive of urea.

9. The Portland cement composition of claim 8 wherein said glycol is a polypropylene glycol and the weight ratio of said glycol and said salt is 1.5:1.

10. A process for increasing the grinding efficiency of Portland cement and for inhibiting the pack set of said cement which comprises, intergrinding with said cement from 0.005 to 1.0 percent by weight of cement of an additive consisting essentially of, a water-soluble glycol and a water-soluble salt of an aliphatic acid having less than three carbons, the ratio of said glycol to said salt being employed in a weight ratio of 1:9 to 9:1, from 0 to 50 percent by weight of the total additive of a water-soluble sulfonated lignin, from 0 to 75 percent by weight of a water-soluble hydroxy alkylamine based on the weight of said glycol and said amine, and from 0 to 50 percent by weight based on the total weight of said additive of urea.

11. A process for increasing the grinding efficiency of Portland cement and for inhibiting the pack set of said cement which comprises, intergrinding with said cement from 0.1 to 0.5 percent by weight of cement of an additive consisting of,
 a. a water-soluble glycol from the group consisting of monoethylene glycol, polyethylene glycols, monopropylene glycols, polypropylene glycols and mixtures thereof and a water-soluble salt from the group consisting of sodium acetate, potassium acetate and mixtures thereof, the ratio of said glycol and said salt being employed at a weight ratio of between 9:1 and 1:9,
 b. from 10 to 30 percent by weight of the total additive being a water-soluble salt of a sulfonated lignin,
 c. from 10 to 50 percent by weight triethanolamine based on the combined weight of said glycol and said amine, and
 d. from 0 to 25 percent by weight based on the total weight of said additive of urea.

12. The process of claim 11 wherein said glycol is a polypropylene glycol and the weight ratio of said glycol to said salt is 1.5:1.